United States Patent [19]

Venzke

[11] 4,089,404
[45] May 16, 1978

[54] TILTING TRAY APPARATUS

[75] Inventor: Charles E. Venzke, New Berlin, Wis.

[73] Assignee: A-T-O, Inc., Willoughby, Ohio

[21] Appl. No.: 727,394

[22] Filed: Sep. 29, 1976

[51] Int. Cl.² .......................................... B65G 47/94
[52] U.S. Cl. ................... 198/365; 198/796; 198/802; 214/62 A
[58] Field of Search .............. 198/351, 355, 365, 793, 198/796, 802; 214/11 R, 62 R, 62 A, 705, 711, 763, 764, 779, 149

[56] References Cited

U.S. PATENT DOCUMENTS

| | | | |
|---|---|---|---|
| 3,163,283 | 12/1964 | Kuwertz | 198/351 |
| 3,167,192 | 1/1965 | Harrison et al. | 214/62 A |
| 3,269,520 | 8/1966 | Bishop et al. | 198/365 |
| 3,318,435 | 5/1967 | Scott | 198/351 |
| 3,327,836 | 6/1967 | Burt | 198/365 |
| 3,360,106 | 12/1967 | Harrison et al. | 198/365 |
| 3,463,298 | 8/1969 | Harrison | 198/365 |
| 3,510,014 | 5/1970 | Speaker et al. | 198/796 |
| 3,865,226 | 2/1975 | Scata | 198/796 |
| 3,881,609 | 5/1975 | Ellis et al. | 214/11 R |
| 3,974,909 | 8/1976 | Johnson | 198/365 |

FOREIGN PATENT DOCUMENTS

| | | | |
|---|---|---|---|
| 665,823 | 7/1963 | Canada | 198/355 |

Primary Examiner—Evon C. Blunk
Assistant Examiner—Richard K. Thomson
Attorney, Agent, or Firm—Wood, Herron & Evans

[57] ABSTRACT

A tilting tray apparatus for use in a sorting conveyor includes a tray carrier and a yieldable spring latch for yieldably holding the carrier in an article carrying position, a bank position, and a discharge position. The latch yieldably resists tray carrier tilting to provide tray control. A tip-up cam surface is provided integrally on the tray carrier for engagement by a tip-up device to tilt the tray carrier to discharge articles thereon.

25 Claims, 7 Drawing Figures

TILTING TRAY APPARATUS

This invention relates to sorting conveyor apparatus wherein carriages, which include article carrying tiltable trays, are conveyed from receiving stations to discharge stations where the trays are selectively tilted to discharge the respective articles into an appropriate article bin. More particularly, this invention relates to an improved tray and to tray latching mechanism for releasably maintaining the tray in predetermined positions.

Automatic conveyor and sorting apparatus utilizing the tiltable tray concept are generally known. For example, U.S. Pat. Nos. 3,034,665, 3,510,014 and 3,630,394 each show such apparatus wherein a sorting conveyor includes a plurality of carriages, each generally including a truck and a tiltable tray mounted thereon. Each carriage is conveyed past a loading or receiving station where an article is placed on the tray of the carriage. Thereafter, the carriage is conveyed to a discharge station comprising a plurality of article receiving bins. When the carriage is adjacent to an appropriate bin, determined by electronic or electro-mechanical means, the tray is tilted to discharge the article into the bin.

As shown in U.S. Pat. Nos. 3,510,014 and 3,630,394, the trays are normally held in a level position by a mechanical latch which must be operated to release the tray for tilting. To accomplish unlatching, the carriages are provided with a cam-lever which is pivoted to the tray carrier. When the tray is to be tilted, a tipping mechanism is placed in the path of the cam-lever. The cam-lever is first pivoted to unlatch the latch. Upon further forward movement over the tipping mechanism, the cam-lever is urged upwardly to cause the tray to tilt discharging the article. Accordingly, these trays are positively latched in horizontal position and are released from the latching mechanism in tilted positions.

When loaded carriages of this type are conveyed around turns at high speeds, centrifugal force tends to cause the articles thereon to fall off. While the trays could be "banked" to prevent this, such banking would require the trays to be unlatched. With the mechanisms provided, it has been found that unlatching for banking purposes is not easily accomplished. The tipping mechanism is projected into the path of the cam-lever for unlatching and tipping the tray to a discharge position. Thus, the tipping mechanism would have to be withdrawn, if only banking were required, since if it was left fully extended, the tray would be tilted too far and the article discharged. Given the fast speed at which the carriages usually run, and the inertia of the carriages and the packages thereon, withdrawal of the tipping mechanism to permit banking is not practical. Further, and once unlatched for banking, the trays must be controlled by external means at all times since they are free to pivot to an extreme discharge position whenever unlatched. Additionally, when the trays are tilted to discharge the articles, they engage a stop or abutment and tend to bounce back or rebound toward a level position in an uncontrolled movement.

Finally, high speed sortation systems require accurate control over the tray tipping operations. If the trays are too abruptly tilted, the articles may be thrown off the tray in a manner to cause article damage or confusion at the discharge station. While the cam surfaces on the cam-levers mentioned above can be structured to control tray tipping to some degree, further and more positive control is desired.

Accordingly, it has been one objective of the present invention to provide an improved latch apparatus for a conveyor carriage with a tiltable tray.

A further objective of the invention has been to provide a conveyor carriage with improved means for releasably securing a tiltable tray in a level position thereon and for holding the tray in a banked position.

A further objective of the invention has been to provide apparatus for controlling carriage tray rebound after the tray has been tilted to discharge an article thereon.

A still further objective of the invention has been to provide an improved conveyor carriage with an improved tiltable tray apparatus.

To these ends, a preferred embodiment of the invention includes a carriage comprising a truck, a tiltable tray and tray carrier thereon, and yieldable spring latch means releasably holding the tray carrier in a level article carrying position, a bank position, or a discharge position, and being operative to permit tray tilting in response to a force exerted directly on the tray or tray carrier. The tray carrier is provided with a cam surface which is directly engaged by a tilting apparatus to tilt the tray to a discharge position. The cam surface is structured in different portions to provide accurate tilting control and to permit positive cam engagement with the tilting apparatus from initial engagement to final tilt or discharge position.

To releasably latch the tray carrier a pin projecting from the carriage truck extends between two curved elongated friction springs mounted on a plate extending from the tiltable tray carrier. An upper spring has a central concave portion for yieldably holding the pin in a position corresponding to a horizontal article carrying position of the tray carrier. Two outward concave portions of this spring define discharge positions for the pin and have surfaces for frictionally engaging the pin to resist tray bounce or rebound immediately after tilting.

A lower spring also includes a central concave portion in register with the central concave portion of the upper spring to assist in holding the pin when the tray carrier is in a horizontal position. Two relatively smaller concave portions near each side of the central concave portion provide spring detents for holding the pin when the tray carrier is in a banked position. Convex portions of the upper spring are in register with these detents to yieldably hold the pin between the springs at the detent.

The springs are spaced apart sufficiently to permit movement of the springs about the pin, and yet to provide desired resistance to movement to operatively hold the tray in its various appropriate positions and to frictionally brake the tray, during its tilting from one position to the other, against the tilting force in order to provide a high degree of tray control. Tilting of the tray to its banked position, toward its discharge position, and back to its horizontal position is actuated by guides (as in the curves of the conveyor for banking), or by selectively actually tilting mechanisms which are controlled to engage the tray carrier's cam surface when tilting for article discharge is desired.

Accordingly, the invention provides improved apparatus for releasably holding a tiltable tray carrier in a desired position and which permits tray tilting, to discharge or bank positions, without requiring mechanical unlatching. Also, the invention provides an improved apparatus which permits direct engagement of the tray carrier by a tilting apparatus to provide accurate tilting control and to eliminate the need for a pivoted camlever unlatching apparatus. Control over the tray and tray carrier is provided by the yieldable engagement of the springs and latch pin so that the tray carrier is under positive control exerted by the springs, and its movements can be precisely controlled. Tilting of the tray carrier does not require complete release of the tray, rather the springs tend to maintain it under control and to hold it positively against the abutment surfaces or guides or tilting mechanisms, thus permitting the tilting movements to be precisely controlled by these surfaces and by the cam surface on the tray.

These and other advantages will become readily apparent from the following description of a preferred embodiment and from the drawings in which.

Figure 1:
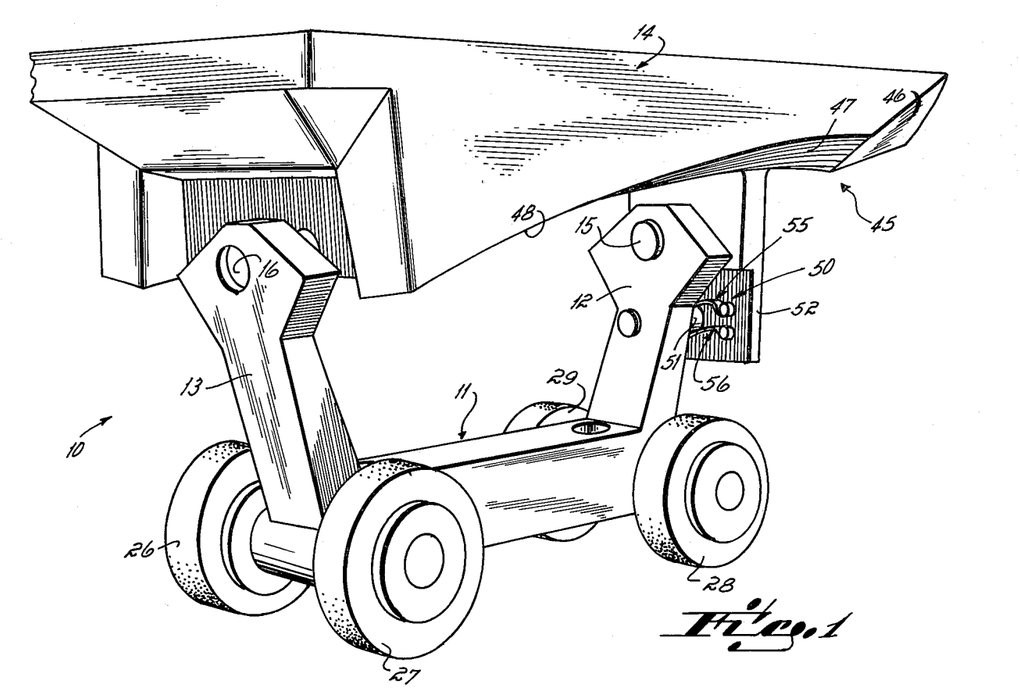
FIG. 1 is a perspective view showing a conveyor carriage according to the invention.
Figure 7:
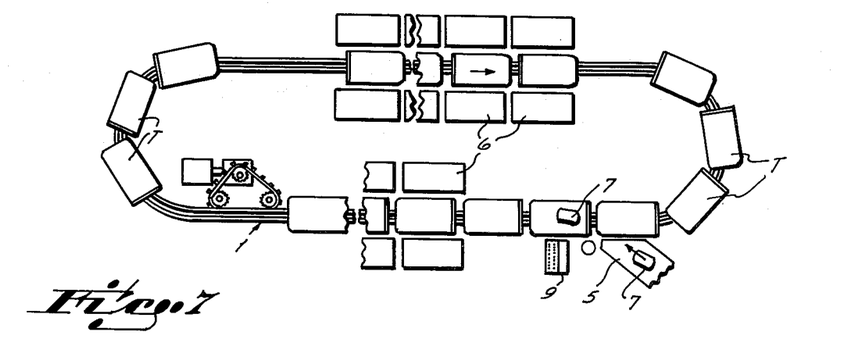
FIG. 7 is a diagrammatic illustration of the sorting conveyor apparatus in which the invention is used.

Turning now to the drawings, and particularly to FIGS. 1 and 7, there is shown in FIG. 1 a carriage 10 according to a preferred embodiment of the invention. The carriage 10 includes a truck 11, which includes forward and rearward upstanding yoke members 12 and 13, respectively, and a tiltable tray carrier 14. The tray carrier 14 is pivotably mounted to the truck 11 at the upper ends of the yoke members 12 and 13 via pivot pins 15 and 16. Tray carrier 14 is adapted to receive a securely mounted tray T (FIGS. 2-5 & 7) of suitable configuration for carrying predetermined article 7 such as boxes, mail pouches, containers, etc. Such trays are securely mounted to tray carriers 14 for tilting motion together with the carriers. As such, the trays and tray carriers form, in combination, an integral element comprising tray carrier means.

The present invention is shown applied to a loop sorting conveyor system similar to that described in the previously referred to U.S. Pat. Nos. 3,034,665 and 3,510,014. Generally, the sorting conveyor system includes a main track 1 formed in an endless loop. A plurality of carriages 10, each defining a load supporting member, is movably supported in track 1. A drive chain 20 (FIG. 2) is mounted in cooperation with the track 1 and interconnected to the several carriages to transport and move the trays in endless sequence about the track 1 between a loading station 5 and a plurality of receiving means such as bins, chutes, containers or receptacles 6. A single input or loading station 5 is shown positioned adjacent one end of the loop in the illustrated embodiment of the invention wherein items or articles 7 are placed onto a particular tray T. When that particular tray is aligned with a selected one of the receiving receptacles 6, a tip-up assembly is actuated and the aligned tray T tipped laterally to discharge the article 7 to the appropriate receptacle.

A control panel 9 may be provided adjacent the loading station 5 for actuating a memory unit, not shown, which provides timed actuation of the tip-up assembly in accordance with the time/distance required for the appropriate tray T to move from the station 5 to the unloading station.

The present invention is particularly directed to the yieldable spring latch between the tray and carriage structure and to the cam surface on the carrier 14. Consequently, such structure, its mounting and interconnection are presently described in more detail to clearly explain and describe the present inventive subject matter. The control, memory unit and the like may take any desired construction or design such as, for example, explained in the previously referred to patents and consequently no further description thereof is presently given herein.

More particularly, each of the carriages 10 is connected to a conveyor chain 20 which includes a number of sections. Each section includes an upper and lower link or side bar 21 and 22 (FIG. 2) and, for example, two chain rollers such as those designated as "R" in the drawings. The understructure of the trucks 11 are connected to the upper links or side bars 21 of the chain via threaded fittings 23 which are secured to the upper links 21.

Figure 5:
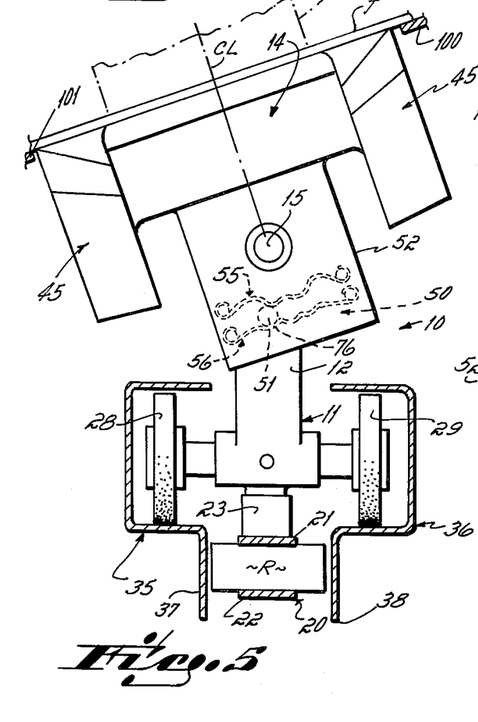
FIG. 5 is a front end view similar to FIG. 3 but showing the tray in a tray bank position.

By way of further explanation of the conveyor mechanism, the truck 11 is also provided with 4 wheels, 26 through 29, which are disposed in opposing portions of a conveyor track. The conveyor track is made up of two opposing sections or channel members 35, 36 (FIG. 5). The channels are normally straight to provide straight conveyor runs, but can be curved to provide a curved conveyor track forming an endless conveyor loop. Each of the channels has a depending wall member 37 and 38, respectively, between which the conveyor chain 20 resides. The rollers R of the conveyor chain 20 have a diameter only slightly less than the distance between the depending wall members 37 and 38.

The construction of the tray carrier 14 and the details of the latching mechanism which yieldably hold the tray carrier and tray (not shown) in position with respect to the truck 11, will now be described. Basically, tray carrier 14 is made from an integral casting and is provided, on at least one side thereof, with the cam surface 45 which includes a forward cam portion 46, an intermediate cam portion 47 and a rearward portion 48. Portions 47 and 48 of the cam surface 45 are adapted for engagement with, for example, a roller 90 (FIG. 2) of a selectively actuable tilting mechanism for tilting the tray about pivots 15 and 16 at a preselected discharge point.

Figure 2:
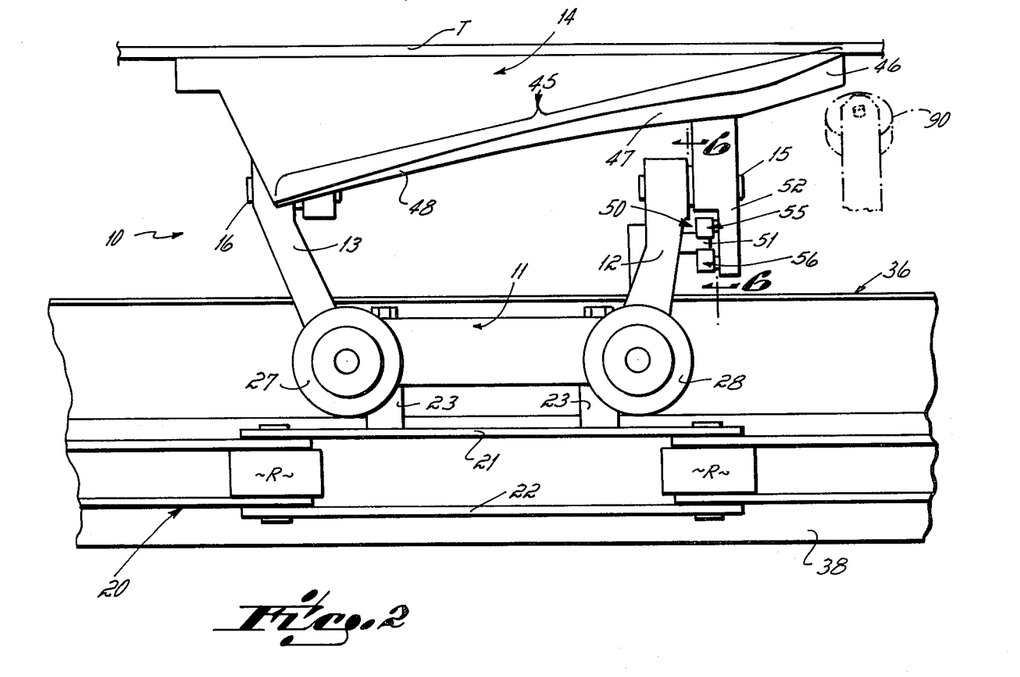
FIG. 2 is a side view of the carriage of FIG. 1.
Figure 4:
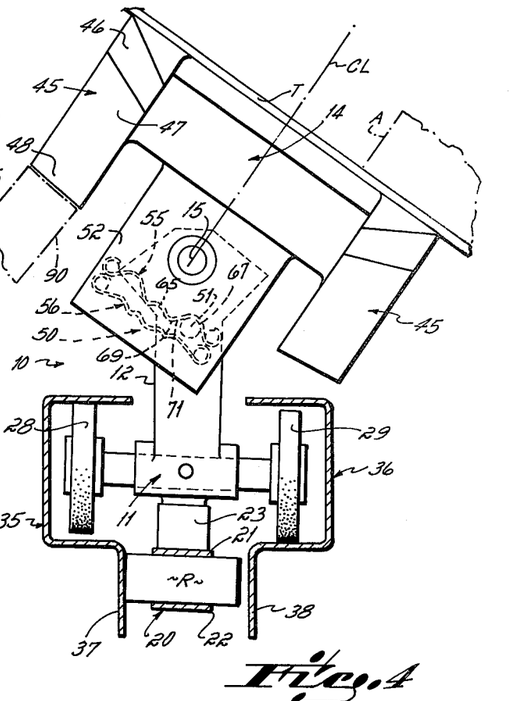
FIG. 4 is a front end view similar to FIG. 3 but showing the tray in a tray tilted position.
Figure 6:
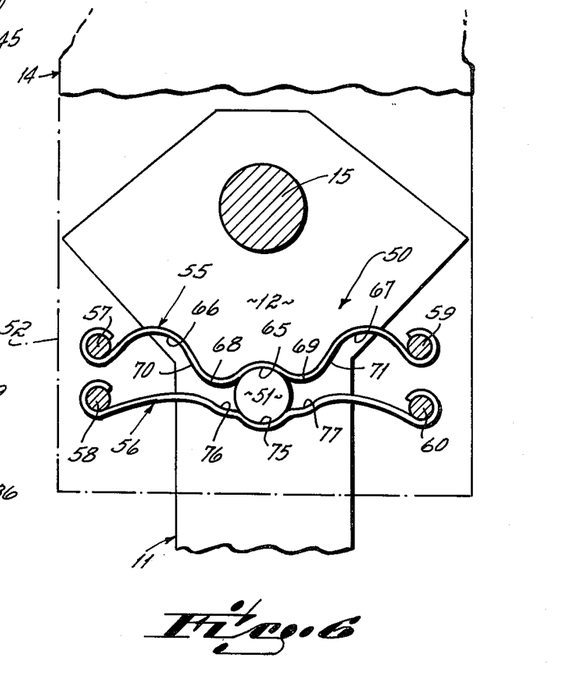
FIG. 6 is an enlarged detail of the spring and pin combination taken along lines 6—6 of FIG. 2.

In order to hold the tray carrier 14 in a horizontal article transporting position, as shown in FIGS. 1 and 2 for example, and yet permit the tray carrier to be tilted to an article discharging position, as shown in FIG. 4, or to a tray bank position such as shown in FIG. 5, an improved latching apparatus 50 is provided. The details of the apparatus 50 are perhaps best seen in FIG. 1 and in FIG. 6. Specifically, a latch pin 51 is secured to the forward upstanding yoke member 12 of truck 11 and extends forwardly thereof. A spring mounting plate 52 extends downwardly from a tray carrier 14. On the spring mounting plate are secured two elongated upper and lower friction springs 55 and 56, respectively. Preferably, the springs 55 and 56 are made from a leaf or spring steel material, in one embodiment having a width of approximately ½ inch. The springs are secured to plate 52 by respective mounting posts 57 through 60, the posts 57–58 being about 2¾ inches apart from respective posts 59 and 60.

In the preferred embodiment, each of the springs 55 and 56 is shaped differently. Upper friction spring 55 is provided with a central concave area 65 for holding the pin 51 when the tray carrier is in an article carrying position. Outwardly of the central concave portion 65, the upper spring 55 is provided on each side thereof with additional convave portions 66 and 67. Each of these portions is adapted to respectively receive the pin 51 in a discharge position corresponding to the tilted tray carrier discharge position. In FIG. 4, for example, the pin 51 resides in a corresponding discharge position in the concave portion 67 when the tray carrier has been tilted to its discharge position as shown.

The lower friction spring 56 is also provided with a central concave portion 75, which is in register with the concave portion 65 of the upper spring and serves to act together with the upper concave portion 65 to hold the pin 51 when the tray carrier 14 is in a horizontal article carrying position.

Figure 3:
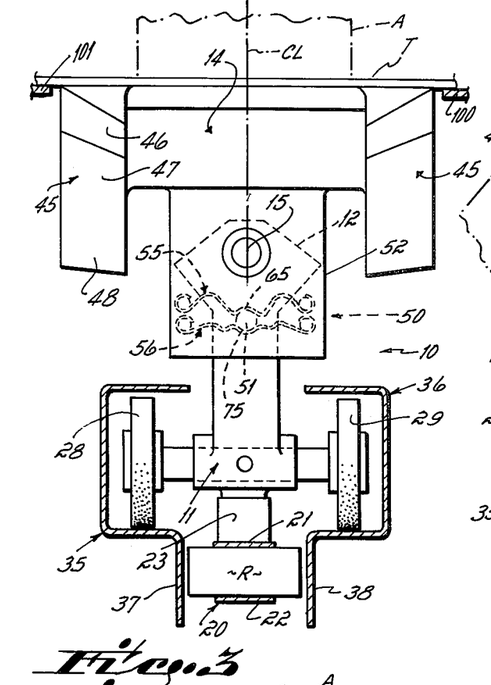
FIG. 3 is a front end view of a carriage as in FIG. 1 with tray in horizontal article conveying position.

The lower spring is further constructed to provide a tray bank latch position. Between the loading station and the article bin, in some installations, it may be necessary to convey the carriage 10 around a curve in the conveyor track. When the conveyor speeds are sufficiently high, centrifugal force acts on the conveyed articles in the curve to cause them to slide across the trays and perhaps fall from the tray. To eliminate this, the tray carriers 14 of the carriages 10 are tilted to a bank position through the curves by a fixed cam, guide or plow 100 acting on the outside bottom side of the tray as shown in FIG. 5. The guide 100 extends around the curve and is inclined so that it initially lies under the tray when the tray is level, and then raises the tray to banked position. A limit guide or cam 101 is provided to limit the tray tilt for banking. Guide 100, after inclining the tray to banked position, levels off to aid in maintaining the tray in banked position. Thereafter it declines to permit the tray to level off. Limiter 101 also extends around the curve to engage the underside of the tray or carrier, and it is inclined upwardly at the end of the curve to tilt the tray into level position, and then cooperates with a declination of the guide 100, at the curve end, to permit the tray to level. Relative positions of the guides 100 and 101 at the end of the curve are shown in FIG. 3.

Accordingly, the lower spring immediately adjacent the central concave portion 75 is provided with relatively smaller concave portions or detents 76 and 77. The detents 76 and 77 are positioned for receiving the pin 51 in bank position corresponding to the tray carrier bank positions when the tray carrier is banked such as shown in FIG. 5. To more securely capture the pin 51 in a detent position 76 or 77, the upper spring 55 is provided with respective convex portions 68 and 69 which are in register with the respective lower detent portions 76 and 77 and which serve to releasably capture the pin when the tray is in the banked position.

Once the tray carriers are tilted to bank positions, the detent tends to hold the carrier at that position and relieves excess wear on the guides 100 and 101 which would otherwise be worn by constant tray engagement. The guides can be slightly relieved from maximum banking engagement to facilitate this.

In a yet additional feature of the invention, each of the concave portions 66 and 67 (FIG. 6) of spring 55 includes respective friction surfaces 70 and 71 which, in combination with the proximity of the lower spring portion 56, serve to resist rebound or bouncing back of the tray carrier from a discharge position to a horizontal level position. For example, as seen in FIG. 4, when the tray carrier 14 is in its extreme discharge position, the pin 51 resides in the concavity 67 of upper spring. When the tray carrier is moved to this position, it engages a bumper or stop (not shown) on the truck 11 and tends to rebound. Before the tray can rebound more than a few degrees, however, the pin 51 engages the portion 71 of the upper spring, which friction must be overcome before the tray can be returned to its horizontal position. In addition, the springs 55 and 56, due to the proximity of convex portions 68 and 69 to the lower spring 56, must be forced apart in order to further receive the pin 51, thus adding to the resistance of the tray to rebound in an uncontrolled manner.

Of course, it will be appreciated that the springs 55 and 56 are initially positioned with respect to each other, and with respect to the diameter of pin 51, so that the springs cooperate to hold the pin 51 in the various positions as described herein and yet provide for tray movement upon and in response to selected forces exerted on the tray carrier. Due to the engagement of the pin by one or both of the elongated springs generally throughout tray tilting toward a discharge position, the yieldable latch tends not only to hold the tray in selected horizontal bank or discharge position, but to resist tray tilting. Thus, tray tilting is significantly retarded and the tray is held against any guiding or tilting surfaces for positive control. Of course, once the tray is tilted sufficiently to permit the article to begin sliding, such control is no longer necessary as the lower side of the tray (between the pivot or tray centerline CL and the article bin) simply falls away from under the article and exerts no adverse force on the article. Accordingly, upper spring 55, including concavities 66 and 67 and surfaces 70 and 71, are structured so that as the tray carrier begins to tilt, the springs engage pin 51 to retard this motion and provide control. After significant tilting, however, the articles slide beyond the tray centerline CL and the tray carrier is permitted to quickly come to its final discharge position due to the fact that the pin passes surfaces 70 or 71 and the angle of spring rotation tends to rotate these surfaces away from the pin.

It should also be appreciated that the latch apparatus 50 through concave spring portions 65 and 75, provides a latch for the tray carrier 14 to maintain it in a horizontal article carrying position for design loads of the trays, without further latching and without undesirable unlatching during level article conveying even when the design loads are off center.

Moreover, and while a preferred embodiment of the invention includes two springs, it should be appreciated that one spring could be utilized to provide the desired yielding control over the tray as discussed above. A single spring could be configured to provide pin engaging and detent positions in accordance with this disclosure. The utilization of two springs in the preferred embodiments insures a measure of continuous control even should one spring malfunction.

In use, the carriage 10 is drawn along conveyor channels 35 and 36 via the conveyor chain 20. When the carriage is moved past a receiving or loading station, an article A, such as that shown in phantom in FIGS. 3, 4 and 5, is pushed onto the tray 14 and is conveyed toward a sorting area or receiving station which comprises a plurality of article receiving bins. During its travel prior to arriving at the bins, however, and depending on the conveyor layout, it may be necessary to draw the carriage about the curve in the conveyor track. In order to eliminate the adverse effects of centrifugal force on the conveyed articles, the tray may be banked as illustrated in FIG. 5 to counteract the centrifugal effect. Tapered guides (not shown) are positioned near one or both of the sides of the tray carriage 14 in order to engage the tray and to tilt it to the bank position shown in FIG. 5. When the tray is moved to a tray bank position, the spring mounting plate 52 is rotated in the required direction, such as counterclockwise as illustrated in the Figure. This force overcomes the bias of the spring 55 and 56 and separates them so that they travel over the pin 51, stopping when the pin is located between the detent 76 and the convex portion 68. The guides are positioned to tilt the tray to the angle shown in FIG. 5 such that the tray is now held in that position by the action of the springs 55 and 56 on the pin 51 at detent 76. Once the carriage is drawn to the end of curved section, further guides (not shown) are used to tilt the tray back to a horizontal article transporting position as shown in FIG. 3. The tray tilt is precisely controlled throughout banking by means of the guides, the resistance to tray tilting provided by the springs, and the detent 76. Once the tray carrier is in banked position, it is held there by the detent and is not dependent on the guides, thereby relieving them from excessive wear.

Subsequently, when the carriage is drawn abreast of an appropriate article receiving bin at a receiving station, an inclined tip-up or tilt member such as a roller 90 (illustrated in phantom lines in FIGS. 2 and 4) of a selectively actuable tilting mechanism is moved into the path of the tray carrier to engage the cam surfaces 47 and 48 and to cause the tray carrier to tilt to the position shown in FIG. 4 to discharge the article A into the appropriate article receiving bin. Retraction of the roller 90 permits subsequent article carrying trays to pass the station in the event that the articles are destined for downstream bins.

When, however, the roller 90 engages the cam surfaces 46 and 47, the tray carrier and tray are tilted to discharge the article. At the same time, the spring mounting plate 52 is moved in a clockwise direction, as shown in FIG. 4, and the springs 55 and 56 are spread apart to permit them to travel along the pin 51 until the pin resides in the concave portion 67 of the upper spring 55. Toward the end of the tilting movement, the spring 55 is rotated so that surface 71 is moved slightly away from the pin to permit the tray carrier to come freely to its discharge position. Bumpers or stop members are provided on the truck for engaging the tray carrier and stopping it in this position. Even if the speed of the tray tilting be such as to impart rebound energy to the tray, the springs 55 and 56 are rotated so that surface 71 engages the pin 51 and tends to resist rebounding. Subsequently, the carriage is run past another guide which engages the tray and overcomes the resistance of the springs 55 and 56 to permit them to slide around the pin 51 so that the tray can be returned to a horizontal article carrying position.

In addition to this description, it will be noted that the understructure of the carriage 10 plays a part in the tray carrier tilting operation. For example, when the roller 90 is actuated to engage the tray carrier 14, the complete combination of truck and conveyor chain is slightly tilted, as shown in FIG. 4, until the wheel 28 engages an upper portion of the channel member 35, and the roller R engages the depending wall portion 37 of the same channel. At this point, further tilting of the complete carriage is prevented. Further tilting of the tray is done against the resistance of the springs 55 and 56. Thus, the tilting of the truck 11 is only that which is permitted by the tolerances both between the wheels and the channels in which they reside, and between the roller R of the conveyor chain and the depending walls 37 and 38 of the conveyor track channel members. This is considered when forming the cam surfaces on the tray.

In addition, it will be appreciated that portions of the cam surface 45 are structured to provide controlled article discharge through interaction with the inclined roller 90 of the selectively actuable tipping mechanism. For complete understanding of the cam 45, it will now be described in its entirety. The first forward cam portion 46 of the surface 45 is slightly inclined front to rear and is canted from side to side so as to face an outward direction between the vertical and the horizontal as best seen perhaps in FIGS. 1 and 4. The intermediate section 47 of the cam surface is provided with a relatively small angle of inclination from front to rear and in addition, is decreasingly canted from side to side similarly to the forward cam portion 46. The rearward cam portion 48 is provided with an increasing angle of inclination from front to rear, but the rearward portion 48 is approximately horizontal and is not significantly canted. Alternately, surfaces 47 and 48 may be provided with similar front-to-rear inclination. As will be appreciated, the canting of the various portions of cam surface 45, from the intermediate portion 47 to the rearward portion 48, permits positive roller engagement throughout the length of the cam for full tray loads, the greater side to side inclination of the cam surface 47 permitting full roller engagement when the tray is in a relatively horizontal position, and that inclination decreasing as the tray is drawn past the roller and tilted to a greater degree.

In addition, the front-to-rear inclination of the cam surfaces is increased from front to rear so that initial tilting acceleration of the tray is relatively slow compared to the tilting acceleration as the rearward end portion 48 of the cam surface approaches the roller 90. Thus the cam surfaces can be structured to control the tilting acceleration and general tray movement to discharge the package in a desired manner for the desired carriage speed, and without article damage or displaced article confusion at the receiving station. Thus, surfaces 47 and 48 are engaged to provide tipping for article discharge.

The structure of the cam 45 taken in conjunction with the retarding action of the spring latch 50, provides constant tray control dictated by the cam or guide surfaces.

Surface 46 is provided as a safety feature. In the event of a malfunction in the tipping mechanism, it is possible for a downstream roller to remain in its upward tipping position. If an immediately following tray is horizontal or is tipped to a position corresponding to the position of the raised tipping roller, there is no safety problem and the only potential problem is an undesired discharge. If the tray carrier had previously been tipped in an opposite direction, however, it could engage the tipping mechanism and damage it or jam the conveyor.

Surface 46 is provided on the carrier in such a position to permit it to engage a malfunctioning tipping roller to eliminate such problems. In the event the lower side of a previously tipped tray carrier is conveyed against a raised tipping roller, the roller simply engages surface 46 and the tray is tipped to or through a horizontal position toward an opposite discharge position. Engagement of the roller by the tray may bias the malfunctioning roller to its withdrawn position and in any event eliminates jams or damage.

These and other advantages and modifications will be readily appreciated from the foregoing without departing from the scope of this invention and the applicant herein intends to be bound only by the claims appended hereto.

I claim:

1. Sorting conveyor apparatus including a plurality of carriages which are conveyed between loading stations, for accepting articles, and sorting stations having a plurality of article receiving means, said carriages being of the type having a truck and a tiltable tray carrier means mounted on the truck for selective tilting movement to discharge articles, said tray carrier means including a tray, and said tray carrier means being tilted at said sorting station to discharge articles from said tray into a receiving means, and wherein said carriages further comprise yieldable friction latch means operatively connected between said truck and said tray carrier means for frictionally holding said tray carrier means in an article carrying position and for yielding in response to a force selectively exerted on said tray carrier means to permit tilting of the tray carrier, said friction latch means comprising a first latch element on said tray carrier means and a second latch element on said truck, one of said elements frictionally engaging, and exerting a holding force on, the other element for holding said tray carrier means in said article carrying position, and said latch means yielding to permit tilting of the tray carrier means upon the exertion of a force upon one element by the other in excess of said holding force.

2. Apparatus as in claim 1 wherein said yieldable spring friction latch means yieldably retards tilting movement of said tray carrier means.

3. Apparatus as in claim 1 wherein said yieldable friction latch means comprises:
a pin mounted on one of said truck or tiltable tray carrier means; and
two elongated friction springs mounted to the other of said truck or tiltable tray carrier means, said pin extending between said springs and said springs being disposed to releasably hold said pin therebetween.

4. Apparatus as in claim 3 wherein said two elongated springs are shaped to provide at least one discharge position for said pin to accommodate tilting of said tray carrier means to a discharge position.

5. Apparatus as in claim 3 wherein said two elongated springs are shaped to provide at least one tray bank position for said pin.

6. Apparatus as in claim 1 including a cam surface disposed on said tray carrier means, and immovable with respect thereto, and further including selectively activated tilting means for engaging said cam surface to tilt said tray carrier means to a discharge position.

7. Apparatus as in claim 6 wherein said yieldable friction latch means comprises two elongated springs mounted on one of said truck or said tray carrier means, and a pin mounted on the other of said truck or said tray carrier means and releasably captured in one of a plurality of positions between said two leaf springs.

8. Apparatus as in claim 6 wherein said conveyor apparatus further includes guide means for tilting said tray carrier means to a tray bank position, said yieldable friction latch means providing a detent for yieldably engaging said pin and holding said tray carrier means in said tray bank position.

9. Apparatus as in claim 3 wherein said elongated springs comprise opposed pin friction surfaces therebetween to yieldably resist return of a tray carrier means from a discharge position toward an article carrying position.

10. Apparatus as in claim 9 wherein said opposed friction pin surfaces are disposed for movement away from said pin when said tray carrier means approaches a discharge position.

11. Apparatus as in claim 3 wherein said two elongated springs are connected to said tray carrier means and wherein said pin is attached to said truck.

12. Apparatus as in claim 3 wherein one of said springs comprises, with respect to said pin, a pin receiving central concave portion and two further concave portions, one of each outwardly of and on a respective side of said central concave portion, said two outer concave portions forming discharge positions for said pin corresponding to respective discharge positions of said tray carrier means.

13. Apparatus as in claim 12 wherein the other of said springs also has a concave portion in register with the central concave portion of said one spring for releasably engaging said pin in a position corresponding to an article carrying position of said tray carrier means.

14. Apparatus as in claim 13 wherein said lower spring, outwardly on each side of its concave portion, is shaped to urge said pin into said respective two outward concave portions of said upper spring.

15. Apparatus as in claim 14 wherein said other spring is provided with concave detent portions on either side of said central concave portion in order to define releasable tray bank positions for said pin.

16. Apparatus as in claim 15 wherein said one spring includes, with respect to said pin, convex portions between the central concave portion and the respective outward concave portions, said convex portions being in register with the concave detent portions of the other spring to urge said pin therein.

17. Apparatus as in claim 16 wherein said concave portions on said one spring define friction means for engaging said pin and for yieldably resisting relative movement between said tray carrier means and said truck.

18. Apparatus as in claim 3 including a spring plate connected to said tray carrier means, said elongated friction springs being mounted on said plate, and said pin being mounted on said truck and extending between said springs.

19. Apparatus as in claim 1 wherein said yieldable friction latch means includes latching portions for yieldably holding said tray carrier means in different positions.

20. A conveyor carriage for use in a sorting conveyor apparatus wherein a plurality of carriages are conveyed between article loading stations and article sorting stations where articles are discharged by the carriages into receiving means, each of said carriages including a truck and a tray carrier means tiltably mounted thereon for carrying articles, when in an article carrying position, and for discharging articles when tilted to a discharge position, said tray carrier means including a tray carrier and a tray mounted thereon, and each of said carriages further comprising yieldable friction latch means operatively connected between said truck and said tray carrier means for frictionally holding said tray carrier means in an article carrying position and for yielding, in response to a tilting force selectively exerted on said tray carrier means, to permit tilting of the tray carrier means to a discharge position, and cam surface means, disposed on said tray carrier means, and immovable with respect thereto, for engagement by an operative member to tilt said tray carrier means to a discharge position against forces exerted by said friction latch means.

21. A carriage as in claim 20 wherein said yieldable friction latch means includes friction surfaces for yieldably resisting tilting of said tray carrier means, and wherein said cam surface means include an elongated cam surface on said tray carrier means, said cam surface having at least an intermediate portion, and a rearward portion, said intermediate portion and said rearward portion respectively and progressively being canted side to side from between a horizontal and vertical position toward a horizontal position.

22. A carriage as in claim 21 wherein said intermediate portion is inclined, respectively, front to rear, less than the front to rear inclination of said rearward portion.

23. A carriage as in claim 21 further including a forward cam surface extending forwardly of said intermediate cam surface, said forward cam surface being inclined, front-to-rear, and being canted side to side from a position between horizontal and vertical toward a horizontal position, said forward cam surface adapted for engaging a tipping mechanism to tilt said tray carrier means.

24. Sorting conveyor apparatus of the type wherein a plurality of carriages are movable through an endless path between loading stations for accepting articles and sorting stations have a plurality of article receiving means, said carriages being of the type having a truck, and a tiltable tray carrier means mounted on the truck for selective full tilting movement to discharge articles, and for partial tilting movement to a bank position for movement about a curved portion of said endless path, said tray carrier means including a tray carrier and a tray attached to the carrier, said tray carrier means being fully tilted at said sorting station to discharge articles into a receiving means, and wherein said carriages further comprise yieldable friction means operatively connected between said truck and said tray carrier means for yieldably holding said tray carrier means in an article carrying position, and said sorting conveyor apparatus further including fixed means engageable with said tray carrier means for effectively moving said tray carrier means to at least a bank position and against forces exerted by said friction means.

25. Apparatus as in claim 24 wherein said yieldable friction means yieldably hold said tray carrier means in a bank position.

* * * * *

UNITED STATES PATENT AND TRADEMARK OFFICE
CERTIFICATE OF CORRECTION

PATENT NO. : 4,089,404

DATED : May 16, 1978

INVENTOR(S) : Charles E. Venzke

It is certified that error appears in the above-identified patent and that said Letters Patent are hereby corrected as shown below:

Column 3, line 11, "or" should be --of--

Column 5, line 9, "convave" should be --concave--

Column 5, line 42, after "carrier," delete "and"

Signed and Sealed this

Fifth Day of June 1979

[SEAL]

Attest:

RUTH C. MASON
*Attesting Officer*

DONALD W. BANNER
*Commissioner of Patents and Trademarks*